(12) United States Patent
Mizusawa et al.

(10) Patent No.: US 7,006,127 B2
(45) Date of Patent: Feb. 28, 2006

(54) DRIVING AIDING SYSTEM

(75) Inventors: Kazufumi Mizusawa, Kawasaki (JP); Shusaku Okamoto, Hirakata (JP); Takashi Yoshida, Ikoma (JP); Ryosuke Iida, Yokohama (JP); Yuichi Hirama, Yokohama (JP); Michio Miwa, Urayasu (JP)

(73) Assignee: Matsushita Electric Industrial. Co., Ltd., Osaka (JP)

( * ) Notice: Subject to any disclaimer, the term of this patent is extended or adjusted under 35 U.S.C. 154(b) by 392 days.

(21) Appl. No.: 10/116,205

(22) Filed: Apr. 4, 2002

(65) Prior Publication Data

US 2002/0145663 A1 Oct. 10, 2002

(30) Foreign Application Priority Data

Apr. 9, 2001 (JP) ............. P. 2001-110257

(51) Int. Cl.
*H04N 7/00* (2006.01)
(52) U.S. Cl. ...................... 348/118; 348/148
(58) Field of Classification Search ........ 348/115–118, 348/148–170, 143; 382/113, 104; 701/41; 414/333; H04N 7/00, 7/12
See application file for complete search history.

(56) References Cited

U.S. PATENT DOCUMENTS

| | | | | |
|---|---|---|---|---|
| 5,452,982 | A * | 9/1995 | Engle | 414/333 |
| 5,650,764 | A | 7/1997 | McCullough | |
| 6,487,305 | B1 * | 11/2002 | Kambe et al. | 382/113 |
| 6,611,744 | B1 * | 8/2003 | Shimazaki et al. | 701/41 |
| 2002/0110262 | A1 * | 8/2002 | Iida et al. | 382/104 |
| 2002/0149673 | A1 * | 10/2002 | Hirama et al. | 348/118 |

FOREIGN PATENT DOCUMENTS

| | | |
|---|---|---|
| DE | 41 35 795 A1 | 5/1993 |
| EP | 1 022 903 A2 | 7/2000 |
| EP | 1 065 642 A2 | 1/2001 |
| JP | 3-295759 | 12/1991 |
| JP | 5-213193 | 8/1993 |
| JP | 11-334470 | 12/1999 |

OTHER PUBLICATIONS

Michael E. Polites, "Technology of Automated Rendezvous and Capture in Space", NASA Marshall Space Flight Center, Mar./Apr. 1999, pp. 280-291 (Cited on ESR-English Text).

* cited by examiner

*Primary Examiner*—Tung Vo
(74) *Attorney, Agent, or Firm*—Pearne & Gordon LLP

(57) ABSTRACT

A driving aiding system includes a displaying section arranged at a position that can be looked at from a driver's seat of a vehicle, an image picking-up section for picking up an image of a rear portion of the vehicle containing at least a part of a hitch that is provided to the rear portion of the vehicle, and an image processing section for causing the displaying section to display a synthesized image that is obtained by image-processing an image picked up by the image picking-up section. A hitch image of own vehicle in addition to an image of a trailed vehicle and an image of a destination coupler are displayed on a screen of the displaying section. As a result, the relative positional relationship between the hitch and the destination coupler can be checked on the screen and thus the hitch coupling operation can be facilitated.

10 Claims, 12 Drawing Sheets

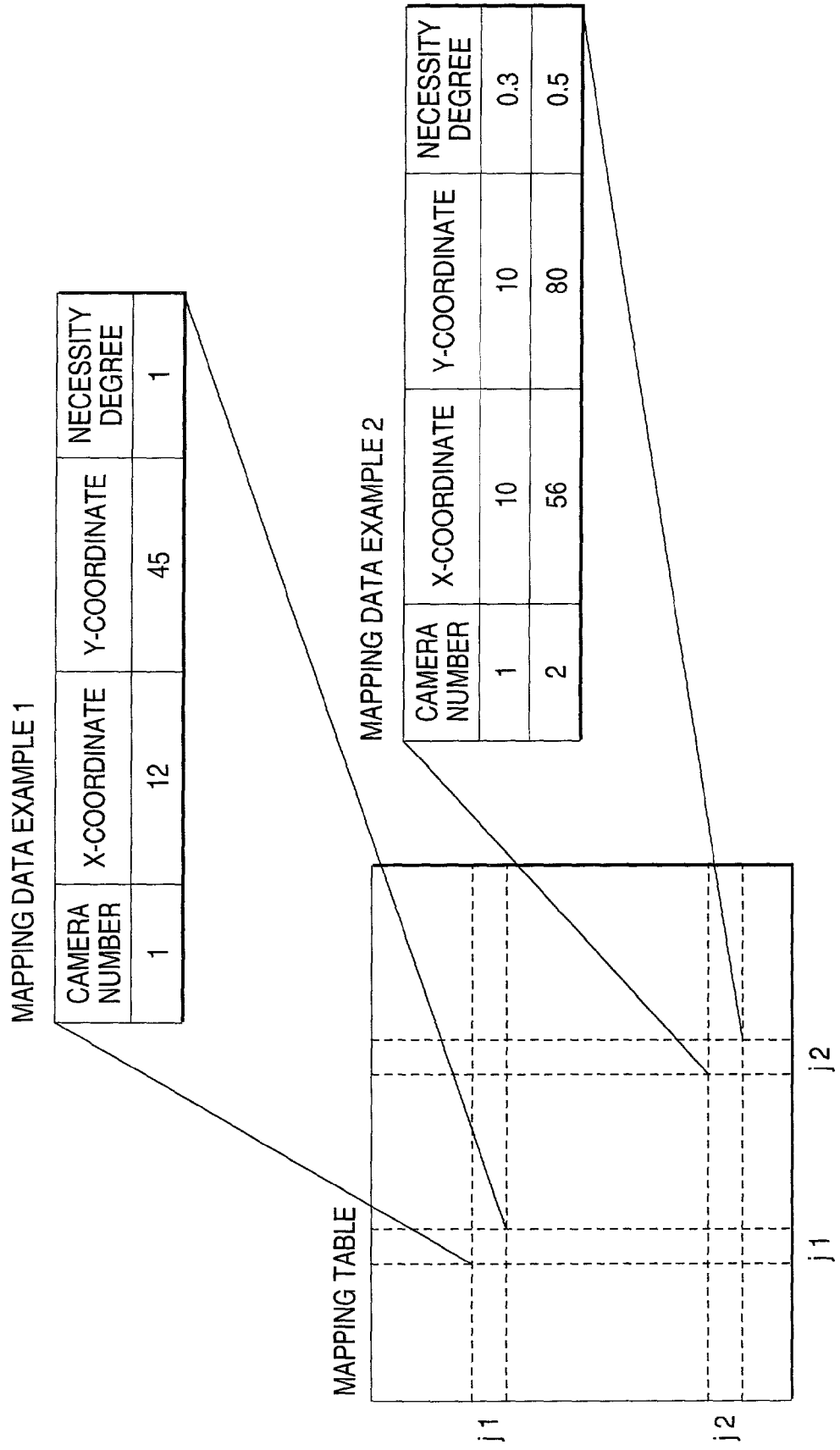

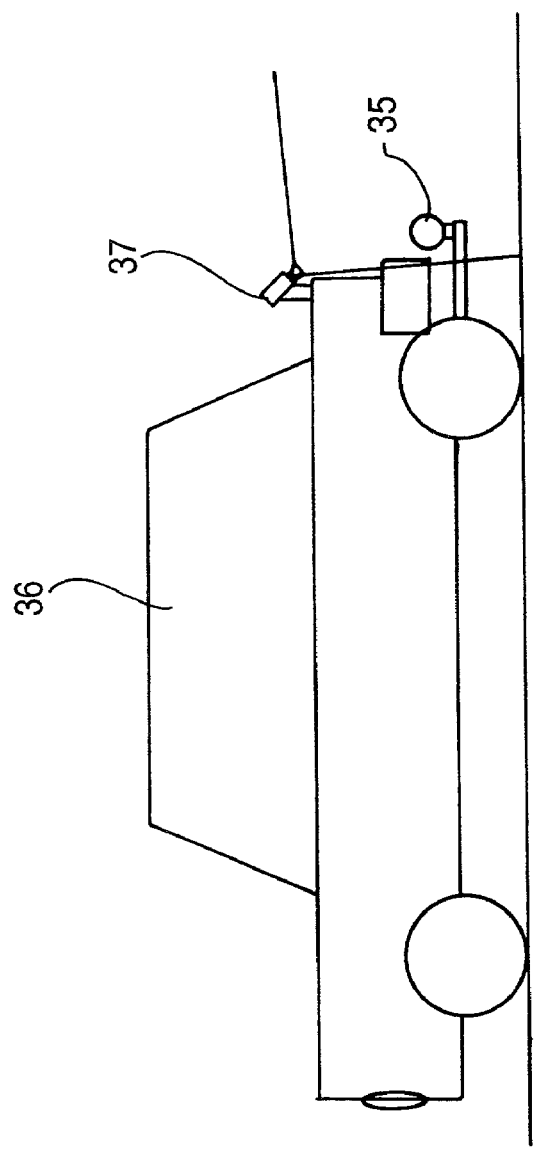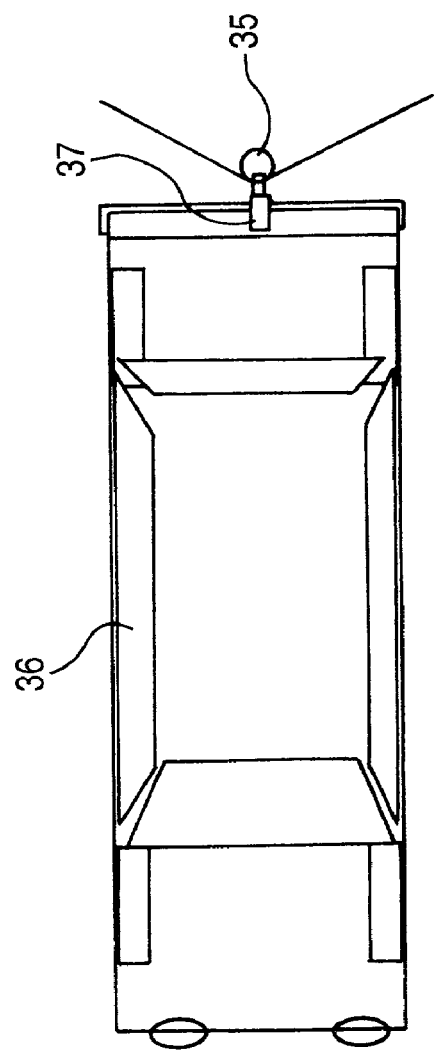
FIG. 3A
FIG. 3B

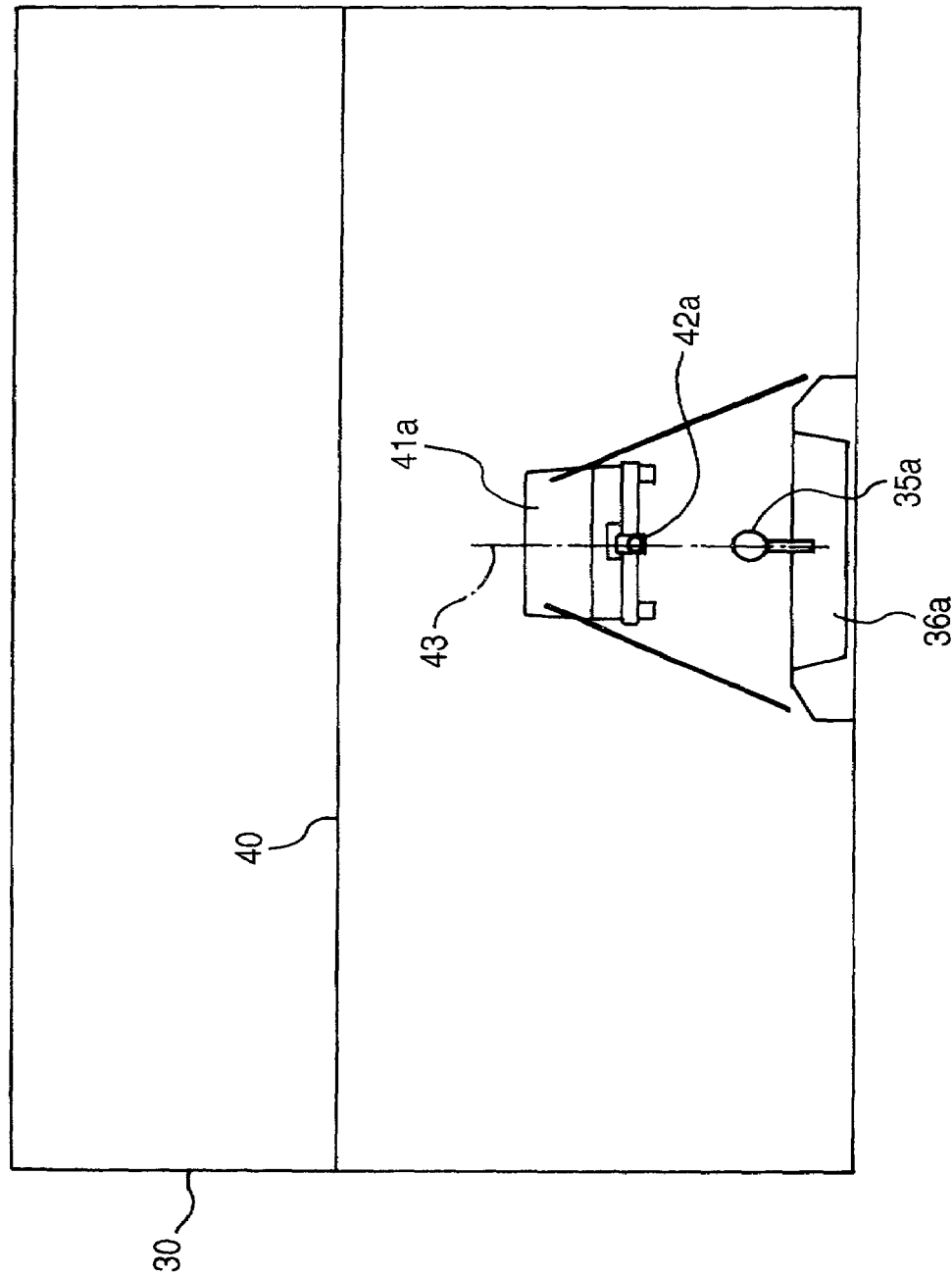

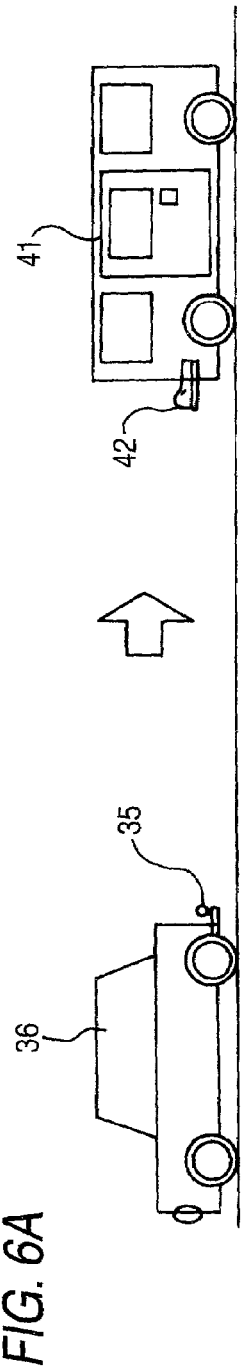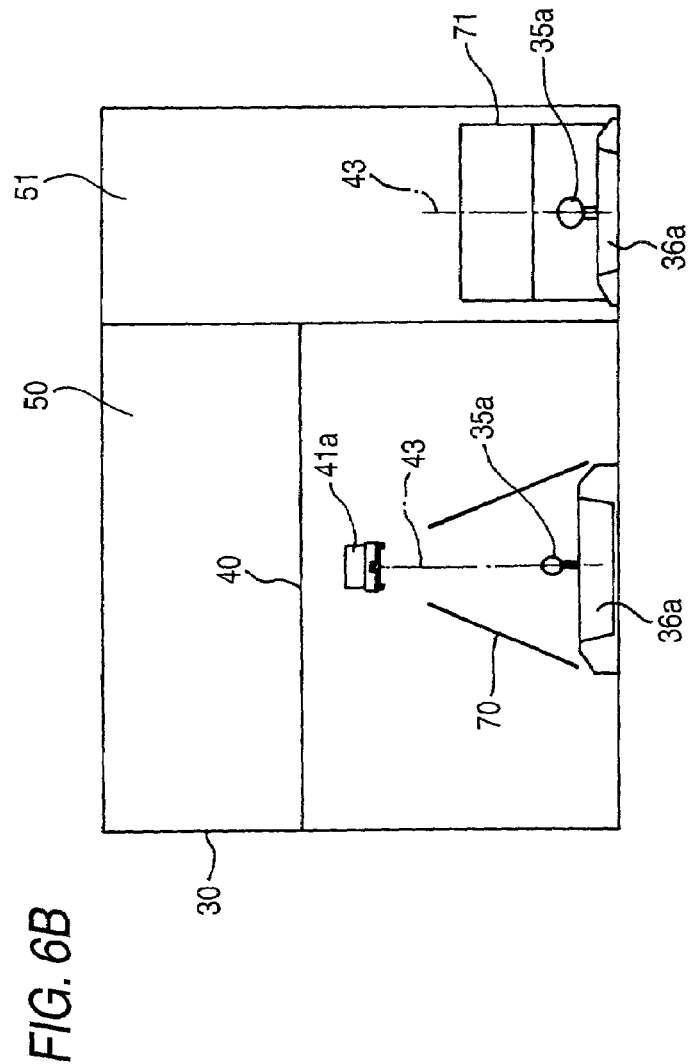
FIG. 6A
FIG. 6B

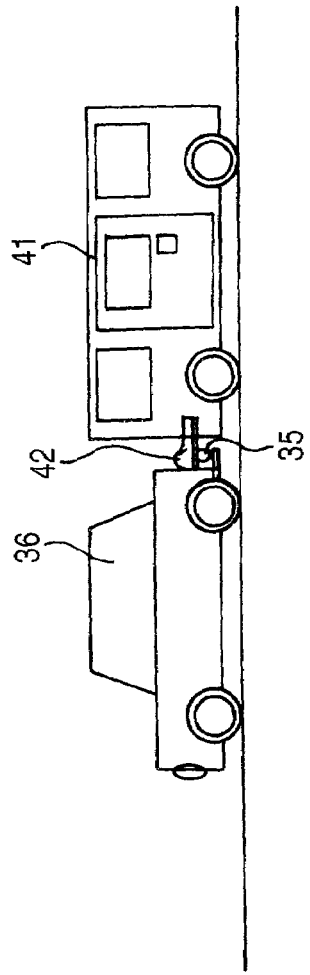
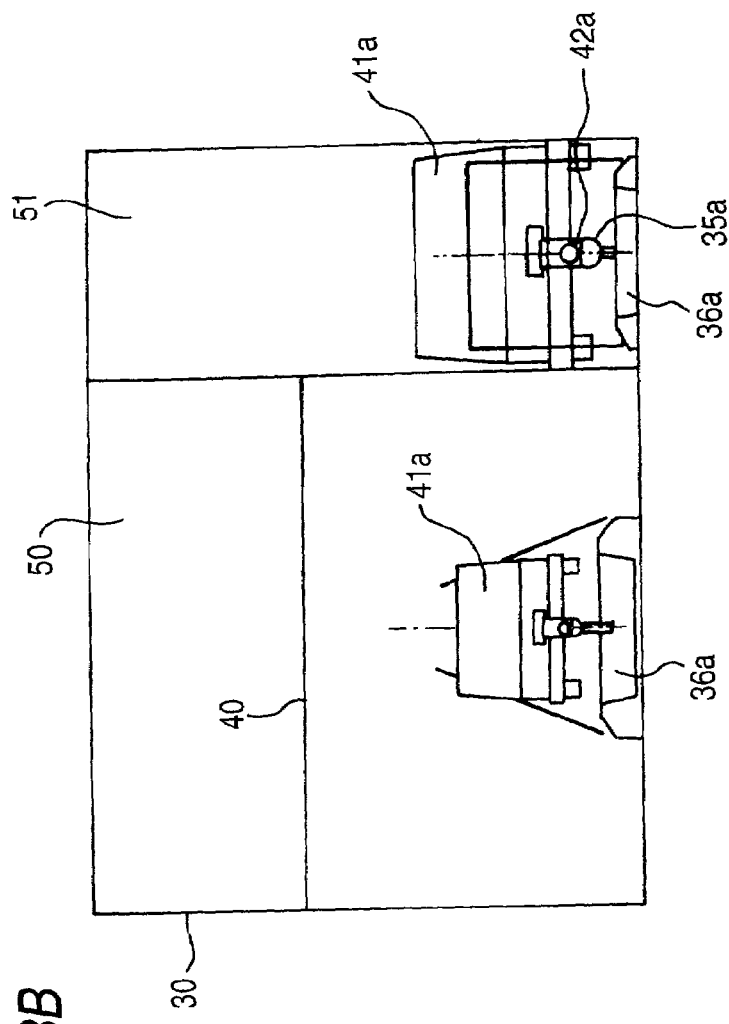
FIG. 8A
FIG. 8B

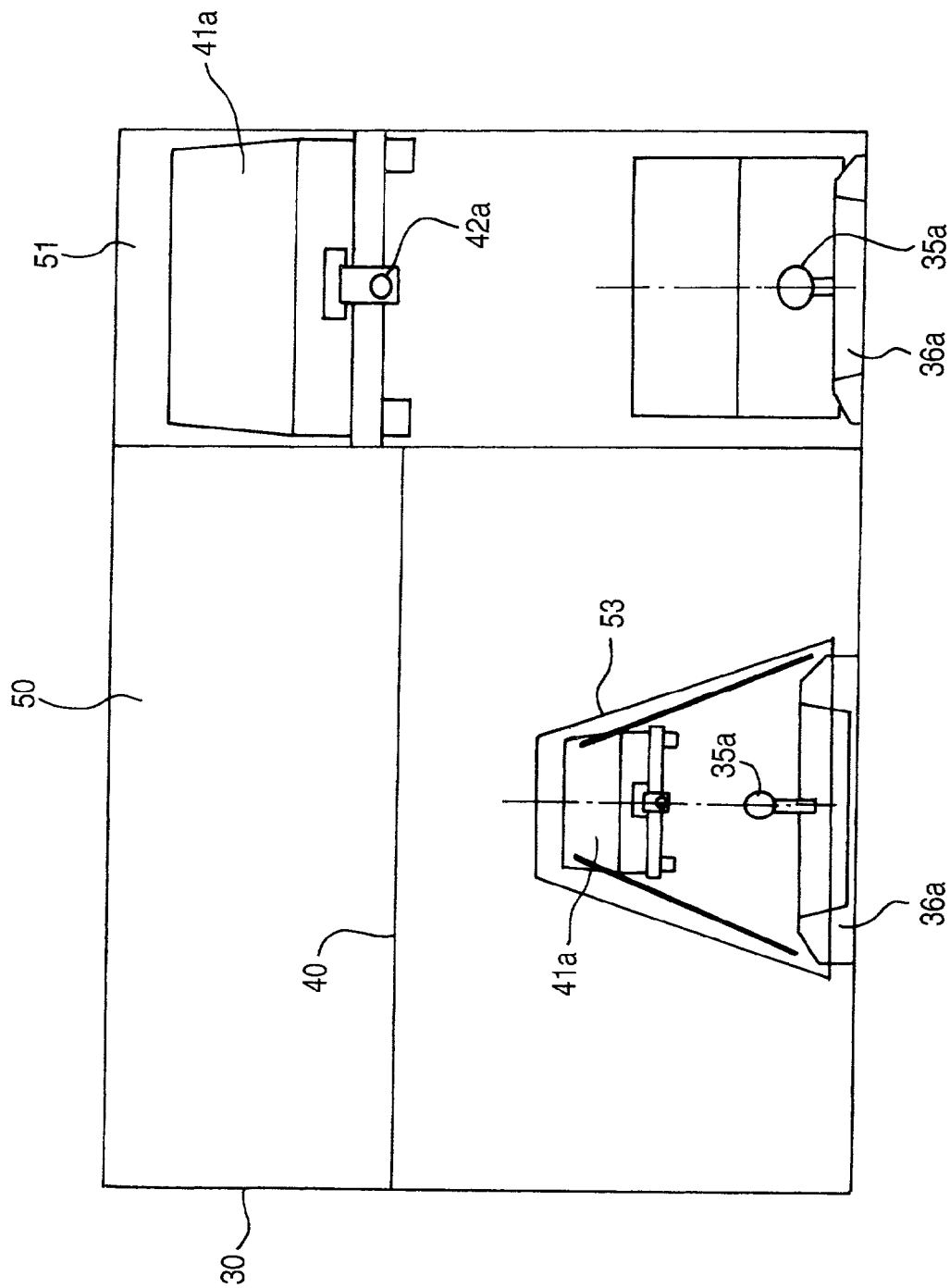

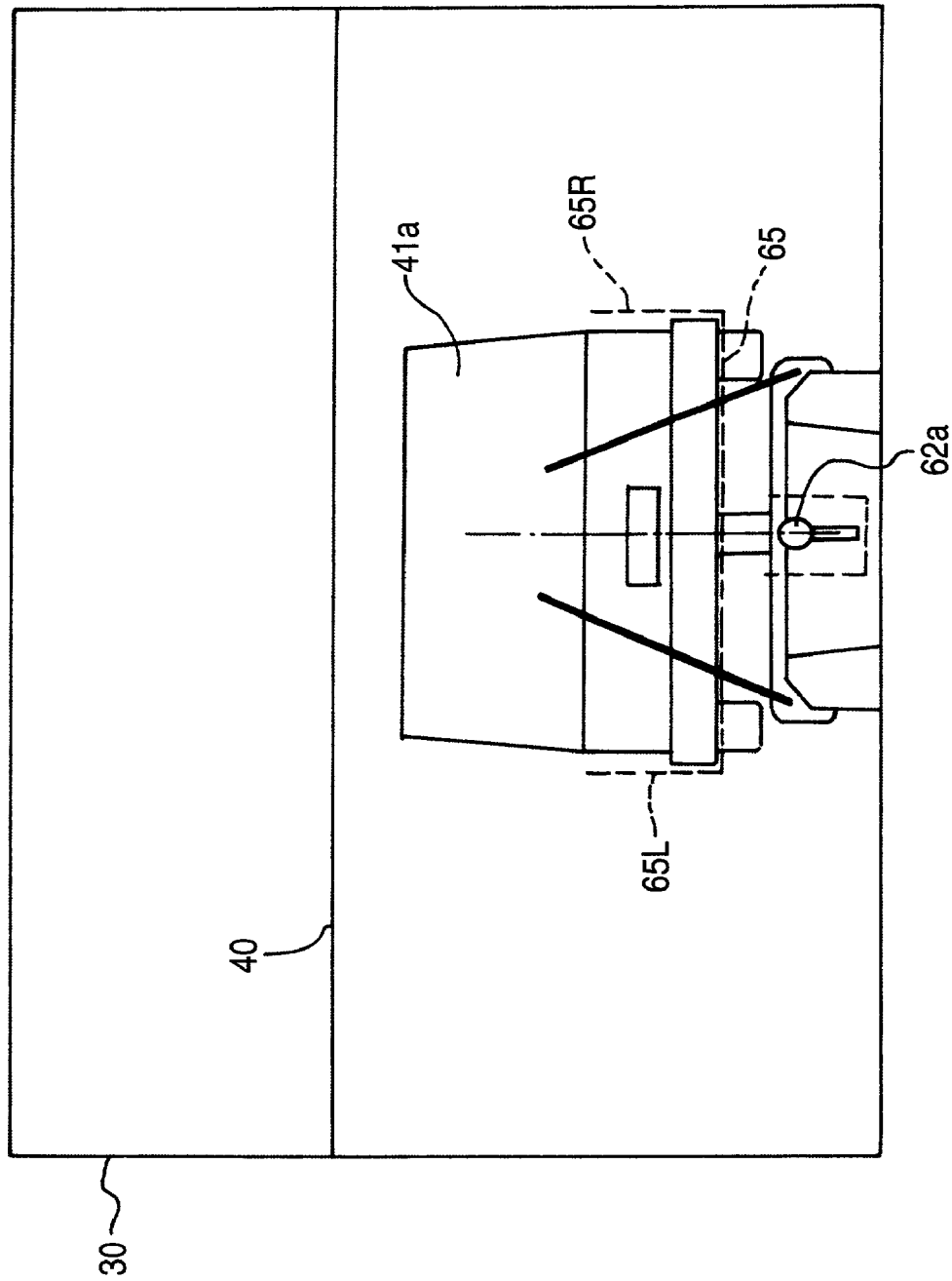

DRIVING AIDING SYSTEM

BACKGROUND OF THE INVENTION

1. Field of the Invention

The present invention relates to a driving aiding system for aiding the drive by displaying an image picked up by a vehicle-equipped camera on a displaying means provided to a position that is visible from a driver's seat and, more particularly, a driving aiding system for aiding the backward driving of the vehicle in the hitch coupling operation by backing the vehicle that is equipped with a hitch, which is coupled onto a trailed vehicle, at a rear portion of the vehicle.

2. Description of the Related Art

The vehicles onto which a driving aiding system, which is capable of checking the safety by providing a rear-view camera to the rear portion of the vehicle and then displaying the image picked up by the rear-view camera on the monitor screen provided near the driver's seat when the vehicle is to be backed, is equipped begin to spread. For the purpose of preventing the contact with the rear obstacle when the vehicle is to be backed at the time of parking, the wide-angle camera is employed as this rear-view camera such that the wide range can be covered in the screen.

In order to couple the trailed vehicle such as the trailer, the camping car, etc. to the rear portion, there are vehicles in which the hitch is provided to the rear portion. When the trailer, etc. is coupled to this hitch, the vehicle is to be backed such that the hitch of the vehicle coincides with the trailer side coupler. But it is a very troublesome driving operation to back the vehicle while controlling the steering wheel such that the hitch that is fitted to a dead angle position, which is not directly seen from the driver, coincides with the trailer side coupler.

The driver can carry out the hitch coupling operation, which is executed by backing the vehicle, alone by displaying the image picked up by the rear-view camera on the monitor screen and then monitoring the monitor image. However, the rear-view camera in the prior art has the main purpose to execute the safety check in backing the vehicle by providing the picked-up image of the camera to the driver, as described above. Thus, the monitor image display format in which it is considered to couple the hitch to the trailed vehicle side coupler is not provided. Therefore, if the camera mode in which the hitch is not contained in the picked-up image of the camera is set, it is impossible to check the situation of the coupled portions from the monitor image. As a result, there is caused the problem that the driving aiding system in the prior art is not totally useful for the hitch coupling operation.

SUMMARY OF THE INVENTION

It is an object of the present invention to provide a driving aiding system that makes it possible for the driver to execute easily the operation to couple a hitch onto a trailed-vehicle side coupler while backing the vehicle without the assistant.

Also, it is another object of the present invention to provide a driving aiding system that is capable of aiding the execution of the backward driving operation of the vehicle in the hitch coupling operation with high precision even when the hitch is not on the image picked up by the camera.

The above object can be achieved by providing a driving aiding system that comprises a displaying means arranged at a position that can be looked at from a driver's seat of a vehicle; an image picking-up means for picking up an image of a rearward direction of the vehicle containing at least a part of a hitch that is provided to the rear portion of the vehicle; and an image processing means for causing the displaying means to display a synthesized image that is obtained by image-processing an image picked up by the image picking-up means.

According to the above configuration, at least a part of the hitch is contained in the image of the rearward direction of the vehicle picked up by the image picking-up means. Therefore, the driver can check the safety of the rear in backing the vehicle and also check the hitch position in the hitch coupling operation. Thus, the driver can operate the steering wheel while grasping the relative positional relationship between the hitch position and the destination coupler on the screen.

Preferably, in the above, the image processing means has a means for switching the synthesized image and an extracted image that is obtained by cutting out a predetermined area of the synthesized image to enlarge or deform and displaying it on the displaying means. Otherwise, the image processing means has a means for displaying the synthesized image and an extracted image that is obtained by cutting out a predetermined area of the synthesized image to enlarge or deform in parallel on one screen of the displaying means.

According to this configuration, both the synthesized image (wide-range image) for displaying the wide range of the rearward direction of the vehicle containing the hitch and the extracted image (neighboring image) obtained by enlarging or viewpoint-transforming the partial area of the wide-range image containing the hitch are prepared. In the hitch coupling operation, the driver can operate the steering wheel while looking at the wide-range image and the neighboring image on the monitor screen. Since the images having different visual fields are prepared, the driver can operate the steering wheel while looking at the wide-range image when own vehicle is far from the trailed vehicle, and also the driver can operate the steering wheel while looking at the neighboring image when own vehicle comes close to the trailed vehicle, whereby the positional alignment between the hitch and the destination coupler can be achieved with good precision. If the wide-range image and the neighboring image are displayed in parallel in one screen, the screen switching operation can be eliminated. Thus, the hitch coupling operation is not interrupted to switch the screen, or there is no necessity that the hitch position should be searched on the new screen because of the screen switching.

More preferably, in the above, the image processing means has a means for displaying a guide line indicating a display area of the extracted image in the synthesized image.

According to this configuration, there is no need to search which part of the wide-range image corresponds to the enlarged image. Thus, the troublesome caused by the change in the monitored image can be reduced.

The above another object can be achieved by providing a driving aiding system that comprises a displaying means arranged at a position that can be looked at from a driver's seat of a vehicle; an image picking-up means for picking up an image of a rearward direction of the vehicle; and an image processing means for superposing an illustrated image of a hitch indicating a presence position of the hitch equipped to a rear portion of the vehicle onto a synthesized image to display when the synthesized image that is obtained by image-processing an image picked up by the image picking-up means is displayed on the displaying means.

According to this configuration, even if the hitch is hidden from the camera, the hitch position can be checked on the screen and thus the hitch coupling operation can be facilitated.

Preferably, in the above, the image processing means has a means for displaying a guide line for guiding a position of a trailed vehicle side coupler to be coupled to the hitch on a screen of the displaying means.

According to this configuration, if the driver backs own vehicle while controlling the steering wheel such that a predetermined portion of the other vehicle that is coupled to own vehicle can coincide with the guide line, own vehicle can be guided to the position to which the hitch can be coupled even though the actual image of the hitch is not displayed on the screen. Thus, the hitch coupling operation can be facilitated.

BRIEF DESCRIPTION OF THE DRAWINGS

FIG. 2 is an explanation view of a mapping table used in the driving aiding system in FIG. 1.

FIG. 3A is a side view of a vehicle onto which a rear-view camera is equipped, and FIG. 3B is a top view thereof.

FIG. 4 is a view showing an example of a screen displayed on the driving aiding system shown in FIG. 1.

FIG. 6A is a view showing the state that a trailing vehicle is away from a trailed vehicle, and FIG. 6B is a view of a displayed example of the screen at that time.

FIG. 8A is a view showing the state that the trailing vehicle comes close to the trailed vehicle to make a hitch coupling possible, and FIG. 8B is a view of a displayed example of the screen at that time.

FIG. 9 is a view showing still another example of the screen displayed on the driving aiding system shown in FIG. 1.

FIG. 12 is a view showing an example of the screen that illustrates such a state that the trailed vehicle comes closer to the hitch coupling position than that in the displayed example of the screen in FIGS. 10A and 10B.

DESCRIPTION OF THE PREFERRED EMBODIMENTS

An embodiment of the present invention will be explained with reference to the drawings hereinafter.

Figure 1:
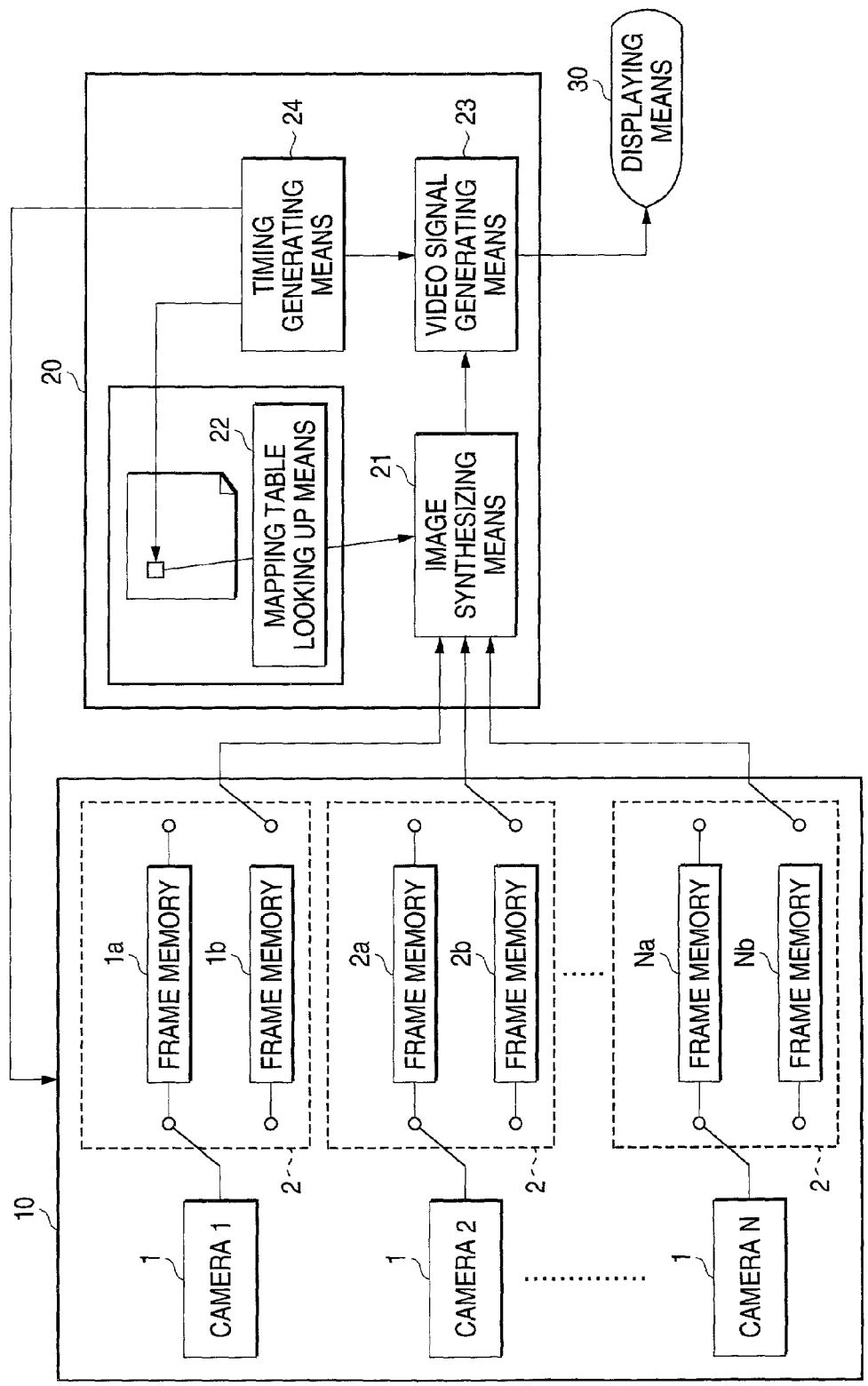
FIG. 1 is a block diagram of a driving aiding system according to an embodiment of the present invention.

FIG. 1 is a block diagram showing a configuration of a driving aiding system according to an embodiment of the present invention. The driving aiding system according to the present embodiment comprises an image picking-up means 10, an image processing portion 20, and a displaying means 30.

The image picking-up means 10 has N image picking-up means (cameras 1 to N) that are equipped onto the vehicle. For example, the image picking-up means 10 has eight cameras in total, i.e., two cameras equipped onto the front portion of the vehicle to monitor the front side of the vehicle, two cameras equipped onto the left side portion of the vehicle to monitor the left side of the vehicle, two cameras equipped onto the right side portion of the vehicle to monitor the right side of the vehicle, and two cameras equipped onto the rear portion of the vehicle to monitor the rear side of the vehicle.

Each camera is typically a color or monochromatic digital camera having the solid state imaging device such as CCD, CMOS device, etc. Also, each camera may consist of the combination of prism and mirror (not shown) and may be constructed such that the incident light that is passed through the lens, the prism, or the mirror can be transmitted to the imaging device positioned at a remote position.

Here, although the vehicle is explained with reference to the passenger car in the present embodiment, such vehicle contains the small passenger car, the truck, the bus, etc. and also contains special-purpose vehicles such as the crane vehicle, the shovel loader, etc.

The image picking-up means 10 further has two frame memories corresponding to the cameras respectively. For instance, an image processing portion 20 reads the information (picked-up image at the preceding capturing timing) stored in the other frame memory Nb in the middle of capturing the picked-up image into one frame memory Na from the camera N.

The image processing portion 20 comprises an image synthesizing means 21 for receiving the picked-up images of respective cameras and then synthesizing the image, a mapping-table looking-up means 22 provided to process the image synthesis at a high speed, a video signal generating means 23 for converting the image generated by the image synthesizing means 21 into the video signal, a timing generating means 24 for outputting a timing signal to the image picking-up means 10, the mapping-table looking-up means 22, and the video signal generating means 23.

The image synthesizing means 21 receives the picked-up images from the cameras 1 to N, and then processes these picked-up images. The processings herein are i) the image transformation process, and ii) the synthesis process (containing the boundary process) of transformed partial images. These processes I), ii) may be performed separately respectively, otherwise all or part of these processes may be performed by one step. In the example in FIG. 1, the configuration having the mapping table is employed so that the processing of the picked-up image is carried out by one step.

The mapping table is a table that is provided to execute the process of converting position coordinates of the pixels of the picked-up image into position coordinates of the pixels of the synthesized image at a high speed. The position coordinates of the pixels of the picked-up image and the position coordinates of the pixels of the synthesized image may have either a one-to-one correspondence or a plural-to-one correspondence. It depends on portions of the vehicle onto which respective cameras should be equipped, what synthesized image should be generated by respective cameras, etc. that the position coordinates of the pixels of the picked-up image and the position coordinates of the pixels of the synthesized image correspond on a one-to-one basis or correspond on a plural-to-one basis. For instance, if the boundary process is applied at the boundary portions between the picked-up images, the position coordinates of the pixels of the picked-up image and the position coordinates of the pixels of the synthesized image do not always correspond on the one-to-one basis.

FIG. 2 is a view showing an example of the mapping table. In this example, the correspondence between the synthesized image and the mapping data is shown based on pixel coordinates (i, j) of the synthesized image. The pixel coordinate (i1, j1) is the pixel of the image picked up by the camera 1, and data of the X-coordinate and the Y-coordinate (12, 45) of the picked-up image and data of the necessity degree (1, 0) are prepared in correspondence with the coordinates (mapping data example 1). In the example in FIG. 2, in the pixel coordinate (i1, j1) of the synthesized image, pixel data of the picked-up image at (12, 45) are employed the necessity degree "1", i.e., the pixel data of the picked-up image is copied as it is and then employed.

In contrast, the pixel coordinate (i2, j2) is the pixel that corresponds to the overlapping portion between the image picked up by the camera 1 and the image picked up by the camera 2, and the data of the X-coordinate and the Y-coordinate of the images picked-up by the camera 1 and the camera 2 and the data of the necessity degree are prepared (mapping data example 2).

In this case, pixel value at (i2, j2) can be decided, for example, such as pixel value={(pixel value of the coordinate (56, 80) of the camera 2)×0.5+(pixel value of the coordinate (10, 10) of the camera 1)×0.3}/(0.5+0.3).

If the table representing these correspondences is prepared by the computation or the manual operation, the synthesized image representing the overall surrounding ground of the vehicle or the synthesized image representing a part of the surrounding ground of the vehicle (e.g., the rear surrounding ground of the vehicle or the side surrounding ground of the vehicle, etc.) can be generated at a high speed. For example, it is possible to synthesize the wide-range image, the neighboring image, or the synthesized image obtained by arranging both images on one screen, to be described later, at a high speed by using this mapping table.

The mapping table may be prepared in the image synthesizing means 21 or prepared on the outside of the image synthesizing means 21. The processor (not shown) in the image synthesizing means 21 looks up any one of the mapping tables for generating the necessary synthesized image, and then generates the synthesized image at a high speed. In this case, it is needless to say that, if the processor can carry out the higher-speed processing, the synthesized image can be generated at a higher speed without the use of the mapping table.

More particularly, the mapping table is stored in ROM (including writable/erasable ROM such as EEPROM, etc.) or RAM, for example. The processor in the above image synthesizing means 21 can write the mapping table onto RAM or ROM by computing the mapping table data, otherwise the mapping table data that are provided as the firmware can be written onto above RAM or ROM by using the data transmitting means such as the communication line, the disk drive, etc., for example.

The displaying means 30 is typically the liquid crystal display, but other display devices such as the plasma display, etc. may be employed. Also, this displaying means 30 may be commonly used as the vehicle-equipped GPS terminal display (display of the so-called car navigation system), or may be prepared separately from this.

FIGS. 3A and 3B are schematic views showing the situation that the camera is equipped onto the rear portion of the vehicle, wherein FIG. 3A is a side view of the vehicle and FIG. 3B is a top view thereof. As shown in FIGS. 3A and 3B, a hitch 35 for coupling a trailed vehicle such as the trailer, the camping car, etc. is fixed under the center portion of the rear bumper of a trailing vehicle 36. A rear-view camera 37 is equipped onto the rear portion of own vehicle 36. In the present embodiment, the camera 37 is fixed to the vehicle 36 such that at least a part of the hitch 35 can enter in the imaging range of the camera 37.

If the fitting number of the rear-view camera 37 is one, the rear-view camera 37 is fitted to the rear portion of the vehicle 36, preferably the upper position of the hitch 35. This upper position of the hitch 35 signifies the right over the hitch 35 as shown in FIG. 3B, but this position is not always limited to the right over the hitch 35. This position may be slightly shifted laterally. In this case, if this position is shifted too much laterally, the horizontal component of the hitch 35 that is looked down at the camera 37 is deviated from the straightly backing direction of the vehicle 36. Therefore, even if the hitch 35 is picked up in the picked-up image of the camera 37, the position alignment between the hitch 35 and the counter coupler becomes difficult. In this meaning, it is desired that the camera 37 should be fitted to the right over the hitch 35 as precise as possible.

Like the present embodiment, if at least a part of the hitch 35 is caught in the picked-up image of the camera 37, the relative positional relationship between the hitch 35 and the trailed vehicle side coupler can be confirmed by looking at the image. Therefore, there can be achieved such an advantage that the hitch coupling operation can be facilitated.

FIG. 4 is a view showing an example of the synthesized image that is synthesized based on the picked-up image of the rear-view camera 37 by using the above mapping table. In this example, the synthesized image that is obtained by processing the picked-up image of one rear-view camera 37 while using the mapping table is shown, but the synthesized image shown in FIG. 4 may be generated by picking up the images of the right and left rear portion of the vehicle separately by means of two rear-view cameras respectively.

Since the picked-up image of the rear-view camera 37 is also used as the image to check the safety when the vehicle is backed, the wide-angle camera is used to pick up the image in as wide the range as possible. Therefore, the actual image picked up by the camera 37 is a considerably distorted image and provides the incomprehensible screen if such actual image is displayed on the displaying means 30 as it is. Thus, in the example shown in FIG. 4, since the synthesized image from which the distortion peculiar to the wide-angle lens is removed is generated by using the mapping table, a horizontal line 40 is displayed as a real straight line and thus the screen from which the sense of distance is easily comprehensible can be obtained.

In FIG. 4, a reference 41a is an image of the trailed vehicle on the coupled destination side, and an image 42a of the destination side coupler is displayed thereon. A reference 36a is an image of the trailing vehicle (own vehicle) 36. If the camera 37 is installed such that the rear end portion of own vehicle 36 can be caught in the pick-up range of the camera 37, the picked-up image itself of the camera or the image that is subjected to the coordinate transformation by using the mapping table can be employed as this image 36a. In contrast, if the camera 37 is installed such that the rear end portion of own vehicle 36 cannot be caught (see FIG. 3A), an illustrated image is employed as the image 36a of the rear end portion of own vehicle 36. An image 35a of the hitch 35 on the screen is the image obtained by coordinate-transforming the real image by using the mapping table. If a guide line 43 indicating the straight rear side is displayed from this image 35a on the screen, the driver can be guided to know whether or not the destination side coupler is positioned in the hitch backing direction.

The working process for coupling the hitch 35 to the coupler on the trailed vehicle side is classified roughly into two processes. One is the working process for bringing the hitch 35 close to the destination coupler to some extent, and the other is the working process for fitting exactly the hitch 35 to the destination coupler by the fine steering wheel control after they come close to each other to some extent.

In the hitch coupling operation consisting of such two working processes, there is caused the problem that, even if the projection of the same one-type image is continued, i.e., even if only the image shown in FIG. 4 is being displayed on the screen during two working processes, such image is not so useful for the hitch coupling. This is because the image that is suitable for one working process is hard to use in the other working process since the visual field range of such image on the screen is too wide or too narrow, or the intermediate image that seem to be applicable to both working processes has the incomplete visual field range for both working processes.

Figure 5:
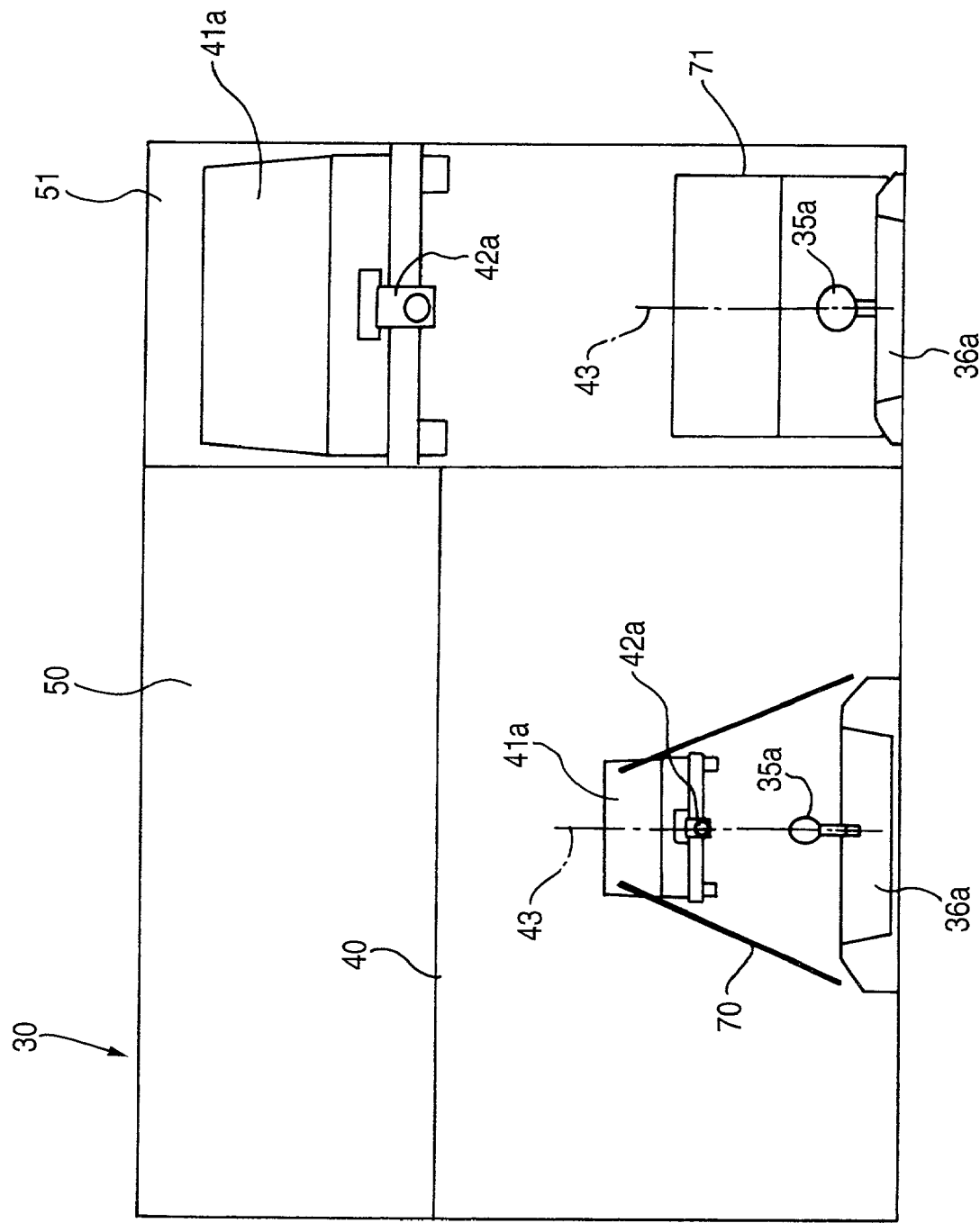
FIG. 5 is a view showing another example of the screen displayed on the driving aiding system shown in FIG. 1.

In order to overcome this problem, in the present embodiment, a wide-range image for displaying a wide range of the rear side of the vehicle to contain the hitch 35 and a neighboring image for displaying merely an extracted partial area to contain the hitch 35 in this wide-range image (the neighboring image is not limited to the neighboring, but a part of the wide-range image may be employed) are generated, and then the wide-range image and the neighboring image are switched to display. Preferably, as shown in FIG. 5, the screen of the displaying means 30 is divided into two screens, and the wide-range image 50 and the neighboring image 51 are displayed in parallel. It is possible to generate simultaneously both the wide-range image 50 and the neighboring image 51 by using one mapping table to display them on the screen of the displaying means 30, otherwise it is possible to generate the wide-range image 50 and the neighboring image 51 separately to display them. In this case, in FIGS. 4 and 5, a reference 70 denotes a guide line indicating a width of own vehicle, and a reference 71 denotes a guide line indicating a width of own vehicle and a distance from own vehicle.

FIGS. 6A, 6B, 7A, 7B, 8A and 8B are views illustrating the transition of the image displayed on the screen of the displaying means 30 along with the progress of respective working processes in the hitch coupling. FIG. 6B is a displayed example of the screen in the starting state of the hitch coupling operation (as shown in FIG. 6A, own vehicle 36 is remote from the trailed vehicle 41). In this state, the trailed vehicle 41 is not displayed in the neighboring image 51 on the right side of the synthesized image. Thus, while looking at the wide-range image 50 on the left side of the synthesized image, the driver backs own vehicle 36 to come close to the trailed vehicle 41 until the trailed vehicle 41 can be displayed in the neighboring image 51

Figures 7A, 7B:
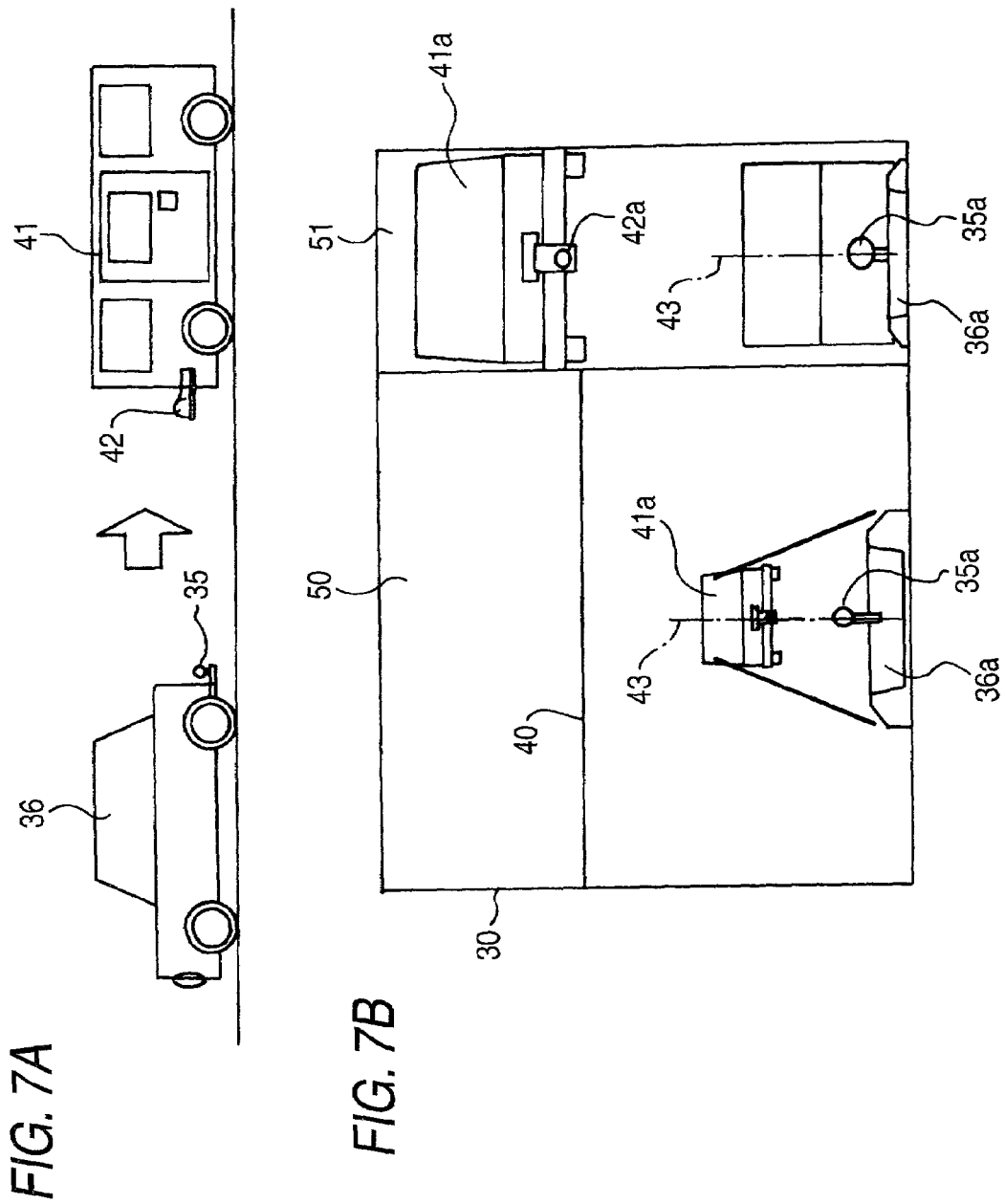
FIG. 7A is a view showing the state that the trailing vehicle comes close to the trailed vehicle.
FIG. 7B is a view of a displayed example of the screen at that time.

Then, as shown in FIG. 7(a), if own vehicle 36 is brought close to the trailed vehicle 41 to some extent and also the image 42a of the coupler of the trailed vehicle appears in the neighboring image 51 in FIG. 7(b), the driver's steady gaze is shifted from the wide-range image 50 displayed on the left side to the neighboring image 51 displayed on the right side. In this state, the driver backs own vehicle at a low speed while controlling the steering wheel to achieve the high-precision positional alignment between the hitch 35 and the destination coupler 42. In this way, as shown in FIG. 8A, the positional alignment between the hitch 35 and the destination coupler 42 is completed, and the screen display at that time is shown in FIG. 8B.

In this manner, the driver can back own vehicle 36 slowly while checking the rough relative positional relationship between the trailed vehicle 41 and own vehicle 36 by the wide-range image 50 on the left on the screen in the first process of the hitch coupling operation, and then execute the precise positional alignment between them while looking at the neighboring image 51, in which the hitch image 36a and the destination coupler 42a are enlarged, in the next process.

FIG. 9 is a view showing a displayed example of the screen according to another embodiment of the present invention. In the synthesized image shown in FIG. 5, both the wide-range image 50 and the neighboring image 51 are merely displayed in parallel in one screen. In contrast, in the example of the screen shown in FIG. 9, the relationship between them is clearly shown on the screen. More particularly, an auxiliary line 53 indicating the area of the neighboring image 51 is depicted in the wide-range image 50. That is, the area that is surrounded by a trapezoid (the auxiliary line 53) at the central lower portion of the left wide-range image 50 corresponds to the depicted area of the right neighboring image 51.

In this fashion, because the correspondence between these two images 50, 51 is clearly shown, the driver can easily understand the timing at which the monitoring object should be switched from the wide-range image 50 to the neighboring image 51. Thus, the confusion such that which image should be looked at can be prevented.

In this case, both the wide-range image 50 and the neighboring image 51 maybe displayed in one screen after the screen is divided, like the example in FIG. 5. Also, the wide-range image 50 and the neighboring image 51 are generated separately such that two images can be shown separately, and then these two images may be switched by the driver's screen switching operation, e.g., the touch operation onto the screen. Also, it is possible to execute this switching automatically. For example, the distance sensor such as the ultrasonic sensor is equipped onto the rear portion of own vehicle, then the wide-range image 50 may be displayed on the screen of the displaying means 30 until a distance to the trailed vehicle reaches a predetermined distance, and then the neighboring image 51 may be displayed on the screen when own vehicle comes closer than the predetermined distance.

Figure 10A:
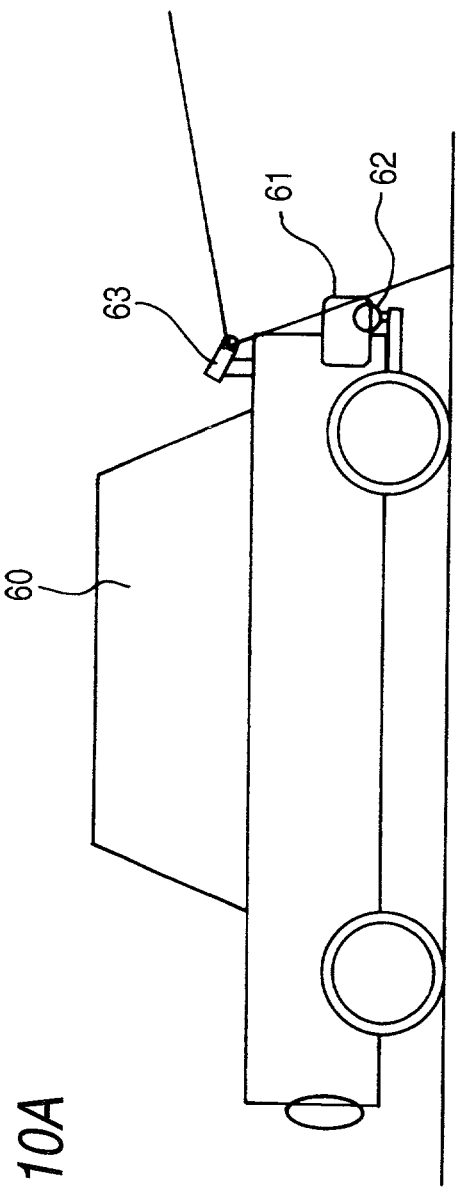
FIG. 10A is a side view of the vehicle in which a hitch is provided to the position at which the hitch is hidden from a rear-view camera.
Figure 10B:
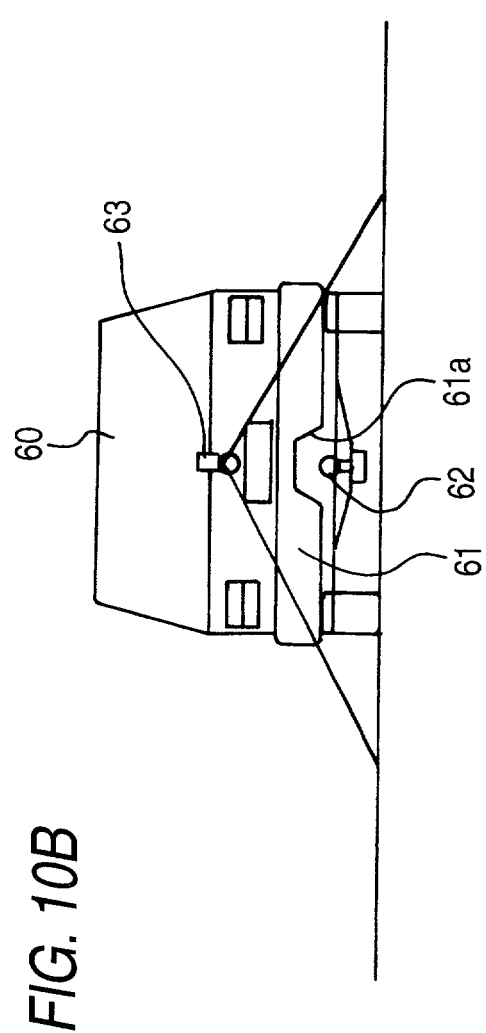
FIG. 10B is a rear view thereof.

In the above embodiment, the installing position of the camera onto the vehicle is decided such that at least a part of the hitch can be picked up by the camera. However, actually the cases where the camera cannot be physically equipped onto the vehicle so as to pick up the hitch are not small in number. For instance, as shown in FIGS. 10A and 10B, if a concave portion 61a is formed in the center lower portion of a rear portion side bumper 61 of a trailing vehicle 60 and then a hitch 62 is fitted to the lower position of the concave portion 61a, the hitch 62 cannot be directly looked at by a rear-view camera 63 equipped onto the rear portion of the vehicle 60. In such case, there is the necessity that the driver can execute the hitch coupling operation while looking at the picked-up image of the rear-view camera. In addition, in the case of the vehicle 60 shown in FIGS. 10A and 10B, own vehicle 60 must be backed such that the destination coupler as well as the hitch can be fitted into the concave portion 61a of the bumper 61 (FIG. 10B). Thus, the higher-precision steering wheel control is requested.

Figure 11:
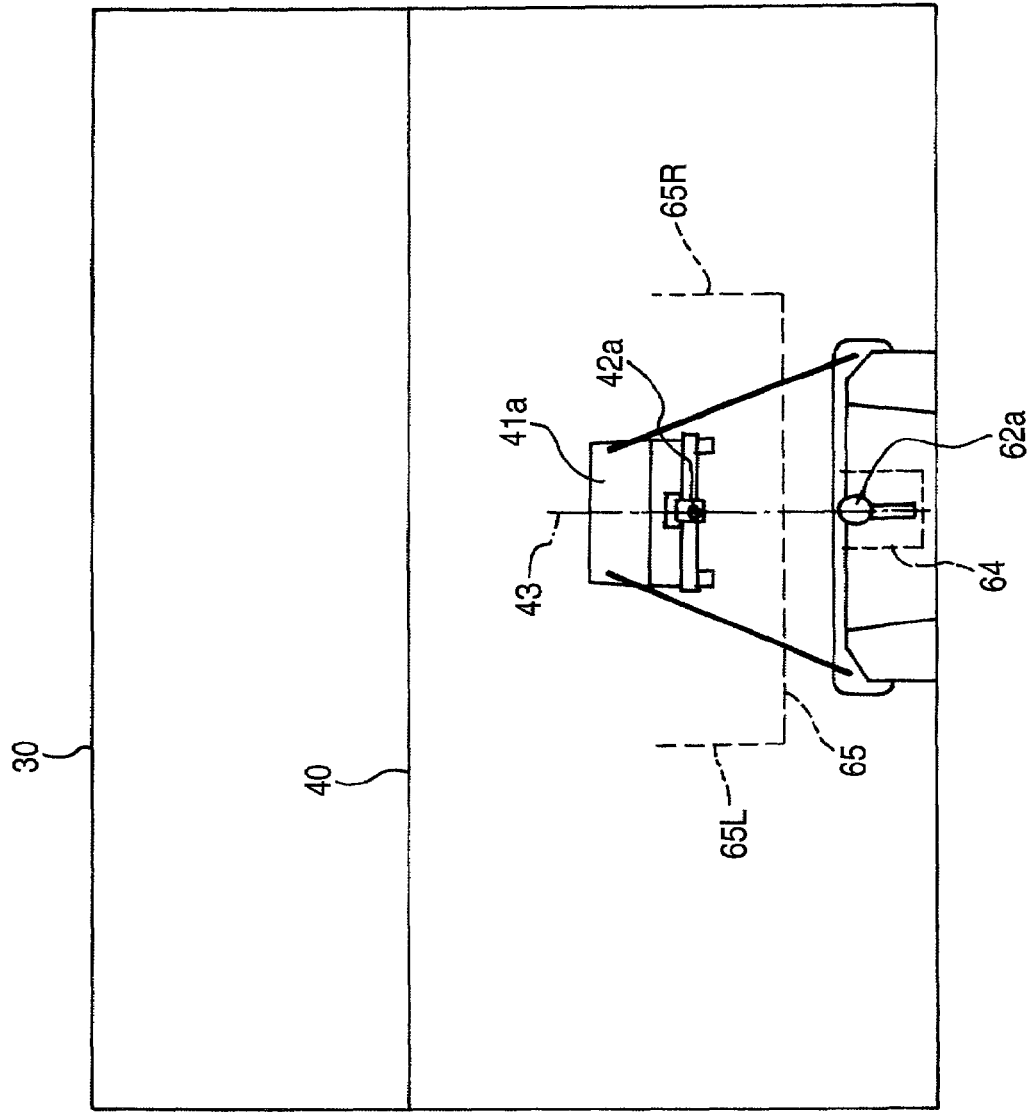
FIG. 11 is a view showing a displayed example of the screen on the driving aiding system that is equipped onto the vehicle in FIGS. 10A and 10B.

Therefore, if the image of the hitch cannot be directly picked up by the camera, embodiments shown in FIG. 11 and FIG. 12 deal with such case. In a displayed example of the screen shown in FIG. 11, a guide 62a indicating the position of the hitch (in this example, the illustrated image of the hitch) is displayed by superposing on the synthesized image as shown in FIG. 4. In addition, in the present embodiment, an alignment guide (guide corresponding to the concave portion 61a of the bumper: a guide line indicated like a near "U" shape by a dotted line around the hitch illustrated image 62a in FIG. 11) 64 of the destination coupler and a guide line 65 indicating the top end bumper position of the trailed vehicle, which serves as an aim of the hitch coupling end, are displayed. Since this guide line 65 is shaped into the near "U" shape to both end portions of which guide lines 65L, 65R indicating positions of the widths that are same as the image widths of the trailed vehicle are provided, (the image 42a of) the destination coupler can enter into the inside of the guide line 64 when the image 41a of the trailed vehicle is fitted exactly to a width of this guide line 65. Therefore, the guide line 64 is indispensable and may be provided as the needs may arise.

While looking at the screen display in FIG. 11, i.e., while monitoring the guide 62a indicating the position of the hitch, the driver controls the steering wheel so as to bring the hitch close to the destination coupler and backs own vehicle until the destination coupler is hidden by the bumper of own vehicle, or the like. The attention point at this time is to back own vehicle such that lateral positions of the hitch guide (illustrated image of the hitch) 62a and the image 42a of the destination coupler can coincide with each other, i.e, the image 42a of the destination coupler can coincide with the guide line 43 that is extended straightly backward from the hitch position. If both do not coincide with each other, the forward and backward driving of own vehicle is repeated until the both can coincide with each other. At this time, in order to prevent the event that the destination coupler is removed from the concave portion 61a of the own vehicle bumper to interfere with the bumper 61, the care must be taken not to deviate the image 41a of the trailed vehicle from the left and right guides 65L, 65R of the guide line 65 when the image 42a of the destination coupler is hidden by the own vehicle image 60a.

In this manner, if the illustrated image 62a of the hitch coincides with the image 42a of the destination coupler, then own vehicle is backed straightly and slowly as it is to get the state shown in FIG. 12. Then, the positional alignment of the hitch is completed at a point of time when the guide line 65 and the image of the top end bumper of the trailed vehicle are exactly overlapped.

In this way, according to the present embodiment, even if the rear-view camera cannot pick up the image of the hitch, the positional alignment between the hitch and the coupler on the trailed vehicle side can be carried out with good precision.

Also, in the embodiments in FIG. 11 and FIG. 12, the wide-range image and the neighboring image described in the preceding embodiment can be switched to display or can be displayed in parallel in one screen. In this case, the neighboring image is explained, but the image picking up the neighboring area should not always be employed. For example, if the image portion of the destination coupler is extracted to display, such image portion is effective in the positional alignment of the hitch. Also, the enlarged image is not always employed as the neighboring image, and the deformed image to which the coordinate transformation is applied to arrange the viewpoint over the vehicle may be employed.

According to the present invention, the camera is equipped such that at least a part of the hitch can be displayed in the picked-up image of the camera. Therefore, the relative positional relationship between the hitch and the destination coupler can be easily grasped by the picked-up image of the camera and thus the coupling operation can be carried out with good precision.

Also, in this coupling operation, a plurality of images that are required for the driver and have different visual fields are switched to display or are displayed in parallel simultaneously. Therefore, the coupling operation can be further facilitated.

In addition, even if the hitch cannot be caught by the camera, the proper guiding display can be displayed on the screen. Therefore, the positional alignment required for the higher precision coupling operation can be attained.

What is claimed is:

1. A driving aiding system comprising:
   a displaying means arranged at a position that is looked at from a driver's seat of a vehicle;
   an image picking-up means for picking up an image of a rearward direction of the vehicle containing at least a part of a hitch that is provided to a rear position of the vehicle; and
   an image processing means for causing the displaying means to display a synthesized image that is obtained by image-processing the image picked up by the image picking-up means,
   wherein the image picked up by the image picking-up means is image-processed so as to convert position coordinates of pixels of the picked-up image into position coordinates of pixels of the synthesized image.

2. A driving aiding system comprising:
   a displaying means arranged at a position that is looked at from a driver's seat of a vehicle;
   an image picking-up means for picking up an image of a rearward direction of the vehicle containing at least a part of a hitch that is provided to a rear position of the vehicle; and
   an image processing means for causing the displaying means to display a synthesized image that is obtained by image-processing the image picked up by the image picking-up means,
   wherein the image processing means comprises means for cutting out and deforming the synthesized image which at least cuts out and deforms a predetermined area of the synthesized image.

3. A driving aiding system according to claim 2, wherein means for cutting out and deforming the synthesized image comprises an image enlarging means.

4. A driving aiding system according to claim 2, wherein means for cutting out and deforming the synthesized image comprises an image transforming means which transforms the synthesized image by changing a viewpoint.

5. A driving aiding system according to claim 2, wherein the image processing means has means for switching an image to be displayed at the image displaying means between the synthesized image and an extracted image that is obtained by said cutting out and deforming means.

6. A driving aiding system according to claim 2, wherein the image processing means has means for displaying the synthesized image and an extracted image that is obtained by cutting out and deforming a predetermined area of the synthesized image in parallel on one screen of the displaying means.

7. A driving aiding system according to claim 5, wherein the image processing means has means for displaying a guide line indicating a display area of the extracted image in the synthesized image.

8. A driving aiding system according to claim 6, wherein the image processing means has means for displaying a guide line indicating a display area of the extracted image in the synthesized image.

9. A driving aiding system comprising:
- a displaying means arranged at a position that can be looked at from a driver's seat of a vehicle;
- an image picking-up means for picking up an image of a rearward direction of the vehicle; said vehicle containing at least a part of a hitch; and
- an image processing means for superposing an illustrated image of the hitch indicating a presence position of the hitch equipped to a rear portion of the vehicle onto a synthesized image to display when the synthesized image that is obtained by image-processing the image picked up by the image picking-up means is displayed on the displaying means.

10. A driving aiding system according to claim 5, wherein the image processing means has means for displaying a guide line for guiding a position of a trailed vehicle side coupler to be coupled to the hitch on a screen of the displaying means.

* * * * *